(12) United States Patent
Missling et al.

(10) Patent No.: US 6,589,299 B2
(45) Date of Patent: Jul. 8, 2003

(54) METHOD FOR MAKING ELECTRODE

(75) Inventors: Jeffrey J. Missling, Mound, MN (US);
Brian C. Eastin, Woodbury, MN (US);
Tony B. Hollobaugh, Alexandria, MN (US); Katherine A. Graham, St. Paul, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 147 days.

(21) Appl. No.: 09/782,748

(22) Filed: Feb. 13, 2001

(65) Prior Publication Data

US 2002/0136948 A1 Sep. 26, 2002

(51) Int. Cl.$^7$ .................... H01M 4/62; H01M 4/04
(52) U.S. Cl. ............... 29/623.5; 429/300; 429/218.1; 429/127; 429/162
(58) Field of Search ............. 29/623.5; 429/300, 429/218.1, 127, 162

(56) References Cited

U.S. PATENT DOCUMENTS

| | | | |
|---|---|---|---|
| 2,505,125 A | 4/1950 | List | |
| 3,351,495 A | 11/1967 | Larsen et al. | |
| 4,303,708 A | 12/1981 | Gebhardt et al. | |
| 4,539,256 A | 9/1985 | Shipman | |
| 4,589,197 A | * 5/1986 | North | 29/623.1 |
| 4,652,226 A | 3/1987 | Chevroulet et al. | |
| 4,731,304 A | 3/1988 | Lundquist et al. | |
| 4,897,917 A | 2/1990 | Gauthier et al. | |
| 4,976,904 A | 12/1990 | Bilhorn | |
| 5,013,619 A | * 5/1991 | Cook et al. | 429/189 |
| 5,302,019 A | 4/1994 | Henschel et al. | |
| 5,565,281 A | 10/1996 | Yu et al. | |
| 5,593,462 A | 1/1997 | Gueguen et al. | |
| 5,725,822 A | 3/1998 | Keller et al. | |
| 5,749,927 A | 5/1998 | Chern et al. | |
| 5,804,116 A | 9/1998 | Schmid et al. | |
| 6,136,476 A | 10/2000 | Schutts et al. | |

FOREIGN PATENT DOCUMENTS

| | | | |
|---|---|---|---|
| EP | 0 393 379 A | 10/1990 | |
| WO | WO 97 44847 | 11/1997 | |
| WO | WO 98/05503 | * 2/1998 | B32B/31/30 |
| WO | WO 00 51806 A | 9/2000 | |

OTHER PUBLICATIONS

Perry's Chemical Engineers' Handbook, 7th Edition, Don Green, Editor pp. 18–25 to 18–35.*

* cited by examiner

Primary Examiner—Carol Chaney
(74) Attorney, Agent, or Firm—Daniel C. Schulte; Daniel R. Pastirik (57) ABSTRACT

Described are methods of making electrodes for electrochemical systems, especially cathodes for lithium polymer batteries, and products prepared from the methods; the methods involve the use of a reciprocating extruder, the extrusion of essentially solvent-free systems, or both.

36 Claims, 4 Drawing Sheets

10 OU CATC

Fig. 4

METHOD FOR MAKING ELECTRODE

FIELD OF THE INVENTION

The invention relates to methods of making electrodes for electrochemical systems, especially cathodes for lithium polymer batteries, and products prepared from the methods.

BACKGROUND

Modern electrochemical systems such as fuel cells, capacitors, sensors, and batteries can be constructed of electrochemical components that include a set of electrodes. In batteries, electrodes are typically made up of materials including an active material (i.e., an electrochemically-active material capable of undergoing reduction-oxidation), e.g., an oxide such as vanadium oxide, disposed in a polymeric matrix which may include an ionically-conductive polymer. The greater the amount of active material included in the electrode, the greater the capacity of the battery. Battery electrodes may further contain other useful materials including an electrically-conductive material (sometimes referred to as an "electrically-conductive diluent") such as carbon, and an electrolyte salt such as lithium bis(trifluoromethanesulfonyl)imide, among various others.

Electrodes are often produced using standard coating techniques by dissolving or dispersing the active component, the electrically-conductive material, the electrolyte salt, and the polymer in a solvent and coating the solution onto a substrate. The materials are generally milled prior to being dispersed into the solvent and coated.

Some attempts have been made to prepare electrochemical components by extrusion methods. Such methods may include conditions of high shear and high temperature, making them prone to degrade materials of the electrochemical components, especially the polymer. See, e.g., U.S. Pat. Nos. 4,976,904 and 5,804,116 5,749,927. Some of these have used solvents, plasticizers, liquids, or softening agents to avoid these conditions.

There is an ongoing need for new and improved methods of preparing electrochemical components such as electrodes, e.g., cathodes. Particularly desirable methods would allow the production of electrochemical components without degrading the components, most preferably could be accomplished with minimal or no use of solvents, and would produce an electrochemical component having useful properties, including, preferably, a high loading of active material.

SUMMARY

The invention relates to methods for producing components of electrochemical systems such as electrodes, using a reciprocating, single screw extruder (sometimes referred to herein as a "reciprocating extruder"). Specifically, it has been found that electrode components can be processed, e.g., combined, melted, and/or extruded, using a reciprocating extruder to form electrodes useful in electrochemical systems such as batteries. According to the invention, a reciprocating single screw extruder is used to combine electrode components into an electrode, with excellent distributive mixing, with very useful properties, and preferably without the use of additional solvents. The temperature and shear conditions of the reciprocating single-screw extruder can be sufficiently vigorous to provide a useful and well-mixed, uniform mixture while still being sufficiently mild to avoid significant degradation of the electrode components, such as the polymer. Advantageously, as will be appreciated to the skilled artisan, the method can be used in a continuous process of producing electrodes, e.g., by mixing continuous streams of feed materials in a constant, continuous fashion to produce a continuous stream of extrudate.

Extrusion is a desirable alternative to conventional methods of preparing electrochemical components, such as methods involving solvent coating. Reciprocating extruders are known machinery for extruding plastic materials. A reciprocating extruder includes a screw component with interrupted flights and pins extending from the barrel that align with those interruptions and allow the screw to be reciprocated along its axis. The result is effective mixing with a large number of relatively low shear events, as opposed to typical non-reciprocating single or twin screw extruders, which rely on a relatively low number of high shear events.

In the past, extrusion methods for preparing electrochemical systems have been used with solvents, i.e., "softening solvents." Examples of solvents or "softening solvents" that have been used are ethylene carbonate, propylene carbonate, dimethyl carbonate, dietheyl carbonate, dimethyl adipate, tetramethylene sulfone, gamma-butyrolactone, dimethylformamide, dioctyl phthlate, tetrahydrofuran, polyethylene glycol dimethyl ether, and polyethylene glycol.

Materials used to produce electrodes, especially cathodes, may preferably include an active agent, an electrically-conductive material, "ionically-conductive" polymer, and an electrolyte salt. Other optional ingredients such as additional polymer or other additives may of course also be included. According to the invention, an electrode can be produced with solventless ("neat") forms of materials, and without the addition of a separate solvent ingredient. That is, the invention contemplates processing the electrode components through a reciprocating extruder without any added solvent, and preferably with essentially no solvent or absolutely no solvent at all. As used herein, "solvent" is given its generally accepted and understood meaning, and includes organic and inorganic liquids or plasticizers known to be used or useful to dissolve or soften other organic or inorganic materials, and specifically includes water. Reducing or eliminating solvent from a method of producing battery electrodes has obvious advantages, including environmental advantages in the production of less waste, and elimination of processing steps that are designed to remove the solvent after deposition of the electrode materials onto a substrate, with elimination of attendant costs, time, and labor. Furthermore, if the solvent is not essentially fully removed from the electrode it may also reduce mechanical integrity or stability of the electrode.

Electrodes can be produced according to the invention to exhibit excellent mixing of the active ingredient, electrically-conductive material, polymer, and salt, and can advantageously be prepared to have relatively high active material loadings of greater than about 50 weight percent, e.g., about 60 to 68, or up to 86 weight percent active material. Specifically, an embodiment of the invention involves a continuous, solventless process for compounding a well-mixed, highly filled polymeric material for an electrochemical electrode, e.g., a cathode. The process includes extruding the materials using a reciprocating, single-screw extruder such as the type sold under the trade name Buss Kneader®. The feed arrangement of the different components into the extruder can be any arrangement that proves useful. In one embodiment of the invention, the components are fed to the extruder according to the following arrangement: an electrolyte salt is fed at the extruder's feed throat;

polymer is fed slightly downstream, and an electrically-conductive material and active material are fed further downstream. An extrudate of the processed components is removed from the far downstream end of the extruder, in a shape conducive to the end use application. The processing can be accomplished with reduced degradation of the polymer during processing as compared to other methods.

An aspect of the invention relates to a method for combining electrode components. The electrode components include an active material, an electrically-conductive material, an ionically-conductive polymer, an electrolyte salt, and no added solvent. The method includes processing the electrode components using a reciprocating single screw extruder. Preferably, the individual electrode components and their combined mixture will contain essentially no solvent.

Another aspect of the invention relates to a method for combining electrode components that include an active material, an electrically-conductive material, an ionically-conductive polymer, and an electrolyte salt. The method includes processing an electrode components using a reciprocating single screw extruder and processing ionically-conductive polymer salt complex in a molten state. This is in contrast, for example, to methods of using an extruder to process a solvent-containing mixture for coating.

Yet a further aspect of the invention relates to a method of producing a battery cathode. The method includes processing a mixture of ingredients that include greater than about 50 weight percent active material; from about 1 to about 10 weight percent electrically-conductive material comprising carbon black, graphite, or a combination thereof; from about 10 to about 40 weight percent polymer comprising ionically-conductive, e.g., polyalkylenoxide, polymer; and from about 3 to about 15 weight percent fluorinated lithium salt. Also according to this aspect of the invention, the mixture can include a total of less than about 0.5 percent by weight solvent. The method involves a reciprocating single-screw extruder, and an ionically-conductive polymer salt complex is processed in a molten state.

DETAILED DESCRIPTION

According to the invention, an electrode of an electrochemical cell can be produced by processing with a reciprocating single-screw extruder. The electrode may be any type of electrode, such as a cathode.

The materials processed to produce the electrode (referred to herein for convenience as the "electrode components") can be any materials that are generally known and useful for electrodes or other components of an electrochemical cell. In a preferred embodiment of the invention the electrode components include an active material, an electrically-conductive material, an ionically-conductive polymer, and an electrolyte salt. Most preferably, as described below, none of the electrode materials include solvent (i.e., each is essentially solvent-free), and no solvent is added for processing in the reciprocating extruder.

The active material can be any of a variety of active materials known to be useful ionically-conductive in electrodes, including oxide materials. The exact material used can be chosen based on various factors. As one example, the active material for use in lithium polymer batteries should be capable of storing lithium ion.

Examples of suitable active materials include graphite, amorphous carbon, $Li_xCoO_2$, $Li_xNiO_2$, Co-doped $Li_xNiO_2$, $Li_xMn_2O_4$, $Li_xMnO_2$, $V_2O_5$, $V_6O_{13}$, $Li_xV_3O_8$, $Ba_2SmNiO_5$, $SmMnO_3$, $Sm_3Fe_5O_{12}$, $EuFeO_3$, $EuFe_5O_{12}$, $EuMnO_3$, $LaNiO_3$, $La_2CoO_4$ and $LaMnO_3$ (including the charged and discharged forms of these materials), and conducting polymers such as polypyrrole, polysulfides and polyvinylferrocene. In primary batteries, the cathode can be fluorinated carbon, $SO_2Cl_2$, $Ag_2V_4O_{11}$, $Ag_2CrO_4$, $V_2O_5$, AgCl, $MoO_3$, FeS, CuS, sulfur, polysulfide, and an $O_2$ or $SO_2$ electrode. Particularly preferred electrode active materials include vanadium oxide and lithiated vanadium oxide.

The amount of active material used can be any useful amount, as will be understood by one of ordinary skill. It is typically desired to include as high of a loading of active material as possible, because a relatively higher loading of active material compared to the other non-active materials such as polymer, salt, etc., will provide a battery with a higher capacity. The present invention allows the production of electrodes of a relatively high loading of active material, e.g., greater than about 50 percent by weight active material based on the total weight of all electrode components. Preferred amounts of vanadium oxide active material can be, for example, in the range up to about 86 percent by weight, based on the total weight of all electrode components, e.g., from about 55 to about 80 weight percent, or from about 60 to about 68 percent by weight.

Electrically-conductive material can be included in the electrode to aid in electric conductivity of the electrode. Useful electrically-conductive materials are well known, and can include, for example, carbon, e.g., carbon black or graphite, lamp black, coke, carbon microbeads, carbon fibers, carbon flakes, copper powder, or other metal powders. The actual electrically-conductive material used in any particular electrode can be chosen based on various factors, such as the other materials of the electrode, or the electrochemical system. Often, carbon black or graphite are preferred. Useful amounts of the electrically-conductive material will be understood by the skilled artisan, for any particular electrode, and can be any amount that aids in electronic conductivity of the electrode. An example of a useful amount of electrically-conductive material can be in the range from about 1 to about 10 weight percent electrically-conductive material, based on the total weight of all electrode components.

An ionically-conductive polymer is included as an electrode component as a binder to hold the electrode components together in the form of a functioning mass that is ionically-conductive. The polymer can be chosen to provide desired adhesion and conductivity properties. The ionically-conductive polymer may be a single type of polymer, or may be a mixture of two or more ionically-conductive polymers. Or, the electrode may include a mixture of one or more ionically-conductive polymer with another polymer that is not ionically-conductive.

Ionically-conductive polymers for use in electrode materials are well known and commercially available. One exemplary class of ionically-conductive polymers is the class of polymers that are derivatives of monomers comprising an oxygen-containing monomer or a nitrogen-containing monomer. Preferred ionically-conductive polymers are capable of conducting ions at room temperature, and are capable of dissociating alkali metal salts.

Examples of suitable ionically-conductive polymers include polyethers of the general formula where
- x and y are mole fractions between 0 and 1, and x+y=1, and R is:
  - a straight chain or branched alkyl group having the formula $C_nH_{2n+1}$ where n is 1 to 12;
  - a straight chain or branched arylalkyl group having the formula $ArC_{n'}H_{2n'}$ where n' is 1 to 12 and Ar is an aromatic moiety (e.g. phenyl and naphthyl);
  - an ethylenically unsaturated group having the formula $CHR'=C(R')ZC_{n''}H_{2n''}$, where R' is H or methyl, Z, if present, is —O—, —S—, —SO—, —SO$_2$—, —NH—, —C(O)—, or —C(O)O—, and n" is 0 to 12; or,
  - an oligoether of the general formula $R'(CHR'CH_2O)_n$, where R' and n are as defined above.

Other examples of useful ionically-conductive polymers include polysiloxanes, polyphosphazenes, polyacrylates.

One class of preferred ionically-conductive polymers include polyalkylenoxide homopolymers or copolymers derived from monomers such as ethylene oxide, propylene oxide, butylene oxide, and allyl glycidyl ether. Such polymers are commercially available under such designations as DAP and polyethyleneoxide available from Union Carbide under the designation Polyox. Examples of such ionically-conductive polymers and their preparation are also described, for example, in U.S. Pat. No. 4,303,708, the entirety of which is incorporated herein by reference.

Useful amounts of ionically-conductive polymer used in an electrode can be any amount that will act to bind the other ingredients into a useful electrode, as well as provide desired conductivity. Exemplary amounts may be, for example, in the range from about 10 to about 40 weight percent ionically-conductive polymer, based on the total amount of all electrode components, more preferably from about 26 to about 32 weight percent.

As mentioned, other polymers that are not ionically-conductive may also be used in the electrode. Such polymer may be included to improve mechanical integrity or as a low cost binder. Examples include polyvinylidenefluoride (PVDF), polyacrylonitrile (PAN) and polyvinylpyrrolidinone (PVP), ethylene-propylene-diene (EPDM) terpolymer and emulsified styrene-butadiene rubber, among others. If non-ionically-conductive polymer is included in an electrode, it can be used in any amount that is useful, e.g., to provide a desired property, such as mechanical integrity, and is preferably included in an amount in the range from about 0 to about 50 percent by weight of the total weight of polymer (the total amount of ionically-conductive and non-ionically-conductive polymer).

The electrolyte salt is a highly dissociated salt capable of being dissolved in the ionically-conductive polymer. For lithium polymer batteries, the salt is typically a lithium salt.

Electrolyte salts are well known in the arts relating to electrochemistry and electrochemical systems. Specific examples of preferred lithium salts are also well known and include lithium hexafluoroarsenate, lithium perchlorate, lithium hexafluorophosphate, lithium trifluoroborate, lithium trifluoromethanesulfonate, lithium bis(trifluoromethanesulfonyl)imide, lithium bis(perfluoroethanesulfonyl)imide, lithium tris(trifluoromethanesulfonyl)methide. See also Assignee's copending U.S. patent application Ser. Nos. 08/988,507 filed Dec. 10, 1997, and 09/139,315 filed Aug. 25, 1998, the disclosures of which are incorporated herein by reference. Particularly preferred are lithium hexafluorophosphate and lithium bis(trifluoromethanesulfonyl)imide.

The amount of electrolyte salt included in the electrode components should be enough to provide for a functioning electrode, e.g., to result in a sufficient level of ionic conductivity. Those of ordinary skill will appreciate amounts of the salt that will be useful in electrodes prepared by methods described herein. A useful amount for a particular electrode can depend on a variety of factors such as the particular salt chosen and the types and amounts of the other electrode components. While other amounts may be found to be useful, examples of useful amounts of electrolyte salt can be in the range from about 3 to about 15 weight percent based on the total weight of all electrode components, preferably from about 5 to about 10 weight percent.

Other optional ingredients may also be included in the electrode components, as will be understood by those of ordinary skill. These optional ingredients may include materials such as pore formers, surfactants, flow agents, and antioxidants. According to the practice of the invention, no solvent needs to be included in or added to the electrode components in order to process the components into an electrode, as described herein. Specifically, other methods of producing electrodes include the use of a solvent, e.g., a "softening solvent," to provide a mixture of materials that has rheological properties such as viscosity that are easier to process into an electrode. Examples of these solvents may include ethylene carbonate, propylene carbonate, dimethyl carbonate, dietheyl carbonate, dimethyl adipate, tetramethylene sulfone, gamma-butyrolactone, dimethylformamide, dioctyl phthlate, tetrahydrofuran, polyethylene glycol dimethyl ether, and polyethylene glycol. According to the invention, electrode components can be combined together in their dry, solvent-free, or "neat" forms, and extruded without adding separate solvent, by using a reciprocating, single-screw extruder. This means that no solvent needs to be contained in any of the individual electrode components—e.g., beyond what is present as residual solvent from earlier processing—and no additional solvent needs to be added to the individual or combined electrode components. Most preferably, each one of the individual electrode components can be essentially free of solvent, meaning that each component contains an amount of solvent that is insufficient to act as a processing aid, for example that each electrode component contains less than one half of one percent solvent (<0.5 wt. %) by weight. Furthermore, no solvent needs to be added to any single component or to the combined components for processing. Overall, the combined electrode materials can be processed in a neat, essentially solventless form that contains an amount of solvent that is insufficient to act as a processing aid, e.g., the total amount of solvent contained in the combined electrode components, if any, is less than one half of one percent by weight (<0.5 weight percent). Still more preferably, the combined electrode components during processing can contain less than about 0.1 weight percent solvent based on the total weight of all electrode components, and most preferably the combined electrode components contain no solvent at all.

According to the invention, the electrode components are processed using a reciprocating single-screw extruder. In general, such an extruder includes any extrusion device that includes a single screw shaft that rotates and reciprocates within a barrel and is able to process materials in the space between the shaft and barrel by kneading and mixing the materials, which may be introduced into the barrel via any location along the length of the barrel. These devices are sometimes known as and commonly referred to as Ko-kneaders, Ko-kneters, co-kneaders, pilgrim-step kneaders, continuous kneaders, or Buss Kneaders®. Examples of reciprocating single-screw extruders are described, e.g., in U.S. Pat. Nos. 2,505,125, 4,976,904, 5,302,019, 5,804,116, the entire disclosures of which are incorporated herein by reference. Reciprocating, single-screw extruders are commercially available in various sizes and configurations. For example, Buss Compounding Systems AG of Pratteln, Switzerland, sells a variety of reciprocating single-crew extruders, as does B&P Process Equipment and Systems, LLC (formerly Baker-Perkins) of Saginaw, Mich., USA.

The construction and operating principles of such reciprocating extruders are known. Reciprocating extruders comprise a shaft inside a temperature controlled barrel, and feed ports or openings along the barrel for introducing one or a number of different feed components into the barrel at various positions along the length of the barrel. The barrel can consist of one or several independently and precisely controlled temperature zones. The screw shaft includes a series of flighted elements to advance and mix the material along the length of the screw and barrel while producing a desired amount of shear. The flights are interrupted, i.e. discontinuous, or "broken," typically at one to three points per circumference of the shaft. Flights with three interruptions provide relatively more kneading or mixing action, while flights with fewer interruptions provide relatively more advancing action along the axis of the screw. The flights are angled at a pitch which facilitates a pumping action during rotation of the screw. A wide variety of flighted elements are commercially available which mix, knead, or pump in various proportions. These various flighted elements can be arranged, as is known, in various combinations to facilitate a combination of mixing and advancing action. The barrel includes a number of pins arranged in axial rows that correspond to the interruptions and periodically align with the interruptions of the flights during each rotation of the shaft. The mechanical motion of the shaft is such that for every revolution of the shaft, a single axial reciprocation occurs. The length of this reciprocation is such that the barrel pins interface with the immediately adjacent interrupted shaft flights such that shear and wiping action occurs between the sides of the flights and pins.

At the end of the barrel is a forming or extruding end, e.g. a die, chosen to produce an output stream of the mixed feed materials in a desired form, such as a film or layer.

In operation, heat is transferred to the feed components in the reciprocating extruder from two sources: (1) heating fluid or resistive heaters enclosed in the walls of the barrel and the extruding end; and (2) from the shearing and elongation flow action generated between the barrel pins and the screw flights during rotation and reciprocation of the screw. The total heat supplied from both sources can be controlled to melt one or more of the feed components, preferably without substantial degradation of any of the components.

The revolution rate of the screw shaft can be adjusted to be equal or higher than the rate at which a given size extruder can extrude a desired mass flow rate of combined feed components.

Reciprocating extruders are typically sized based on internal barrel diameter and typically range from 30 mm to 200 mm or larger. The length of the barrel is typically expressed as a multiple of the diameter, and stated as a length to diameter (L/D) ratio. Reciprocating extruders typically have a length ranging from 7 to over 20 L/D ratio.

The operating conditions, including the temperature at the different locations of the extruder, the amount of shear exerted on the feed components (controlled, e.g., by the speed of rotation and the size and scope of the flights and pins), the order of introduction of feed components and the state of each component (e.g., temperature and morphology) at the feed, etc., should be sufficient to produce a well-mixed (uniform), preferably paste-like mixture of the electrode components as an extrudate. Also, the conditions should not cause excessive degradation of any electrode component such as the polymer. The degree of uniformity of the extrudate can be monitored, for example, visually, by scanning electron microscopy, or even indirectly, by considering electric or other properties of the mixture. The amount of degradation of components such as a polymer can be monitored, for example, by monitoring molecular weight of a polymer before and after processing in the extruder. This may be performed by various methods, include gel permeation chromatography.

According to the invention, the electrode components can be processed through the reciprocating extruder using minimal amounts of solvent, e.g., essentially no solvent, most preferably using no solvent. To accomplish this, the polymer salt complex (the ionic complex formed between the ionically-conductive polymer and the salt) should be processed through the reciprocating extruder above its melt temperature, with other electrode components being distributed in the molten polymer salt complex. For this purpose, the term "molten" or "in the melt" means having a sufficiently low viscosity to permit uniform mixing of the feed components and allow the mixture to maintain a paste-like consistency. Preferably, a polymer such as the ionically-conductive polymer can be processed in the extruder in a melt state, e.g., molten. Any temperature that will cause polymer salt complex to exist in a molten state without causing substantial degradation of the polymer or other electrode components, can be useful. Specific examples of useful temperatures can depend on the polymer used. For DAP, preferred temperatures can be in the range from about 60 to about 120 C., e.g., from about 80 to about 100 C.

Each feed stream can be provided to the extruder in any useful form, in any useful order, with each preferably being provided as a continuous, consistent feed flow. Equipment useful for providing a feed flow into the reciprocating extruder is well known and commercially available, with examples being loss in weight screw feeders, vibratory feeders, metering pumps, other extrusion devices, and volumetric feeders.

Any feed configuration that will result in a useful process and a useful extrudate can be used, as will be understood by a skilled artisan. A particular feed method for any given process can be selected to provide consistent continuous flow of the feed components through processing. Components can be fed in a starve fed fashion, meaning that the total mass flow is less than the maximum capacity of the extruder for mass flow at a given set of operating conditions (temperature, revolution rate, etc.). Further, the feed methods ideally maximize throughput, while minimizing polymeric degradation.

In some preferred embodiments of the method, the electrolyte salt can be fed first, and the polymer and other components can be fed downstream from the salt. This configuration can be preferred because the electrolyte salt spontaneously chemically complexes at ambient conditions with the polymer (in preferred formulations) to form a viscous material which, if the polymer were fed upstream with the salt, would adhere to the feed throat walls and block the feed opening causing the process to fail. Therefore, the polymer is preferably fed downstream. The polymer can preferably be fed before or with (as opposed to after) the electrically conductive material and active material because those materials do not melt, or melt at temperatures much higher than the polymer. The polymer provides the matrix into which the electrically conductive material and the active material can be distributed, which facilitates flow in the extruder.

Also in some preferred methods, the lithium salt is preferably fed in a powder form. The electrically conductive material can be fed in the form of a powder, flake, or a fiber, but is preferably in the form of a powder. The active material is preferably fed in the form of a powder having an average particle size (diameter) in the range from about 0.5 to about 5 microns.

According to one exemplary embodiment of the invention, the feed streams can take the form of multiple solventless, i.e., neat, electrode feed components. The arrangement of the feed streams into the reciprocating extruder can vary, and can be chosen to be any useful configuration, but in one preferred embodiment components of an electrode are fed to an extruder according to the following arrangement: an electrolyte salt, e.g., a lithium salt, is fed at the extruder's feed throat (the most upstream position in the extruder where a feed such as solid particulates can be fed into the extruder by gravity); polymer, including at least some or optionally entirely ionically-conductive polymer, is fed downstream; and a mixture of active material and electrically-conductive material is fed further downstream.

Figure 1:
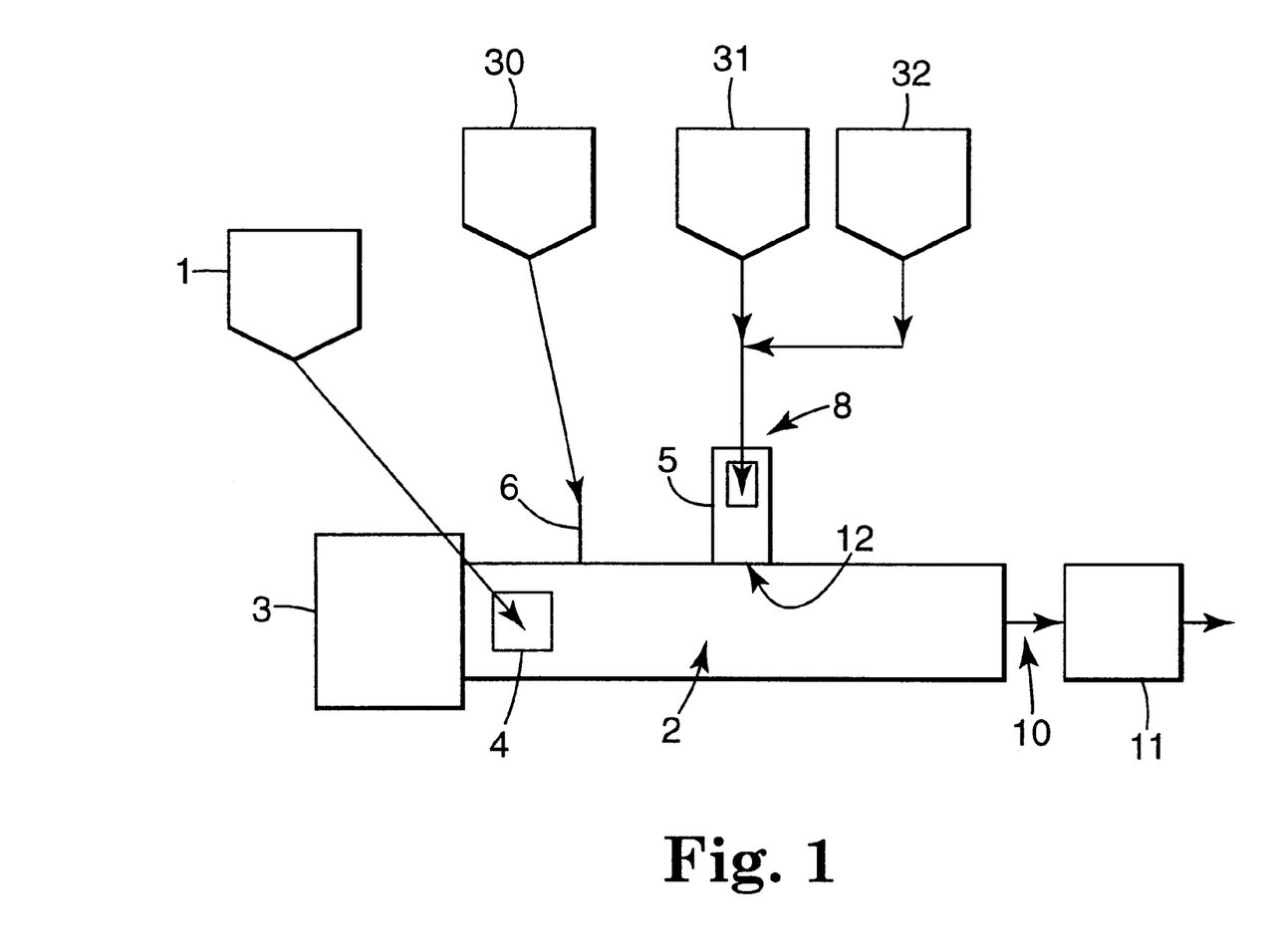
FIGS. 1, 2, and 3, each schematically illustrate top views of illustrative embodiments of a reciprocating extruder used to practice the invention.

This embodiment of the process is illustrated in FIG. 1, which shows a reciprocating extruder 2 having an electrolyte salt (not shown) being fed through feeder 1 at first feed 4 (shown as the feed throat of the extruder 2). Polymer is fed at second feed location 6 using feeder 30. A mixture of active material and electrically-conductive material is fed further downstream. Each of these respectively is first fed through feeder 31 (for the active material) and feeder 32 (for the electrically-conductive material), and the two are mixed together and fed as a mixture into a port 8 of side feeder side feeder 5 which then feeds the mixture into extruder 2 at location 12. Sidefeeder 5 is mounted directly on the side of the extruder at position 12. The sidefeeder 5 feeds the particulates in a positive displacement fashion directly into the inside of the extruder. Alternatively, the mixture could be fed by gravity. Motor 3 operates the extruder screw at a desired speed, causing the feed electrode components to be carried through the extruder 2 to the exit end 10, which optionally includes a die or some type of shaping mechanism. Additional equipment, shown generically as block 11, can be used to further shape or process the extrudate into a desired shape or form; such additional equipment can include one or more of, for example, calendar rolls, another extruder, or a die, etc.

In general, each electrode component can be introduced to the extruder in any form and by any technique that will provide a continuous, consistent flow of the component. Referring again to FIG. 1, the polymer may be provided in some circumstances, for example, through a non-reciprocating single screw extruder 30 that melts the polymer prior to the polymer being introduced to the reciprocating extruder. This is one preferred way of providing a consistent, smooth flow of the polymer to the reciprocating extruder. The non-reciprocating extruder would be operated at a temperature and rotation rate that provide a desired mass flow rate of polymer in a melted state to the extruder. Other continuous extruders could also be used. The flow rate of polymer fed to the reciprocating extruder can be chosen based on factors including the capacity of the reciprocating extruder and the relative amounts of the other electrode components. While it may be preferred in some situations to feed a melted polymer, it may also be useful in other embodiments of the method to feed a polymer in a solid state, e.g., as granular particulates which are a typical form of polymers.

FIG. 1 shows a mixture of active material and electrically-conductive material being fed at feed 8. The active material and electrically conductive material can be fed simultaneously after being preblended or can be fed by separate feeders 31 and 32 into the single feed location 8. One way to preblend is to use a jet mill. See, e.g., Example 1 of U.S. Pat. No. 6,136,476. Both materials are preferably fed as particulates ranging in size from 0.1–5.0 microns.

As is also shown in FIG. 1, an extrudate 10 of the processed electrode components is discharged from the end of the reciprocating extruder, for further processing, e.g., with a die, calendar rolls, another extruder, or any other useful piece of equipment. The extrudate may be formed into a desired configuration, such as a film or coating deposited onto a substrate, and combined with other components of an electrochemical system, such as a battery, e.g., a lithium polymer battery.

Preferably, but not shown in FIG. 1, the extrudate is placed onto a substrate which allows further processing of the extrudate into an electrode. The substrate can be a liner, electrolyte, current collector, or other useful material, as will be appreciated by the skilled artisan. More specifically, a liner can be made of various known materials, including, for example, polypropylene, polyester, polyethylene, or polytetrafluoroethylene; a current collector may be made of, for example, copper, aluminum, or stainless steel; and a separator may be made up of, for example polyethylene or polypropylene.

Figure 2:
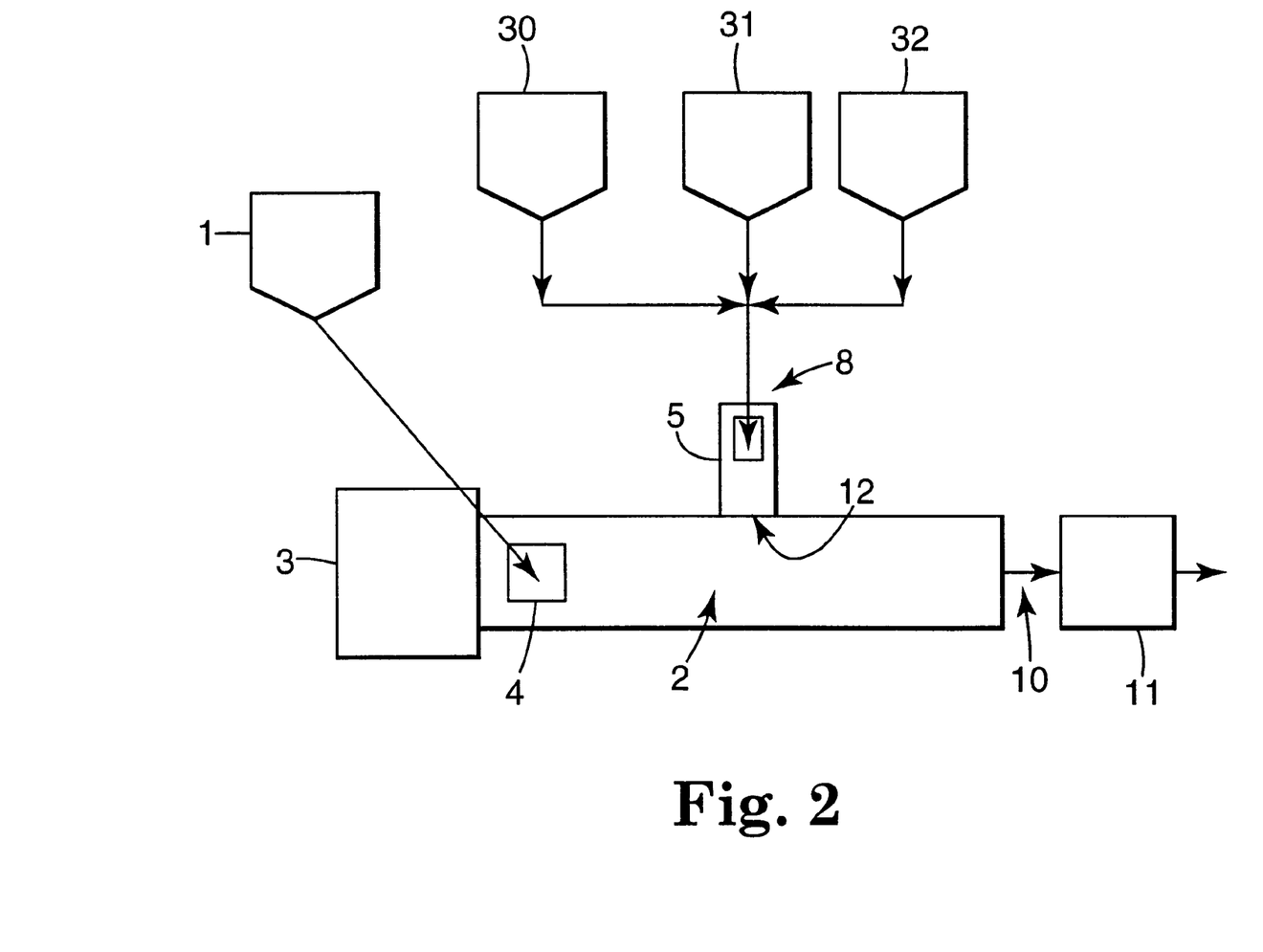

In other embodiments of the invention, the configuration of the feed components can be different. For instance, FIG. 2 illustrates a configuration wherein the electrolyte salt is still fed at the extruder's feed throat 4, and a single feed mixture containing polymer, active material, and electrically-conductive material, is fed somewhere downstream. FIG. 2 shows, more specifically, an embodiment where all three of a polymer, an active material, and an electrically-conductive material, are fed with separate feeders 30, 31, and 32, and combined into a mixture and fed to port 8 of sidefeeder 5 and then to extruder 2 at position 12.

Figure 3:
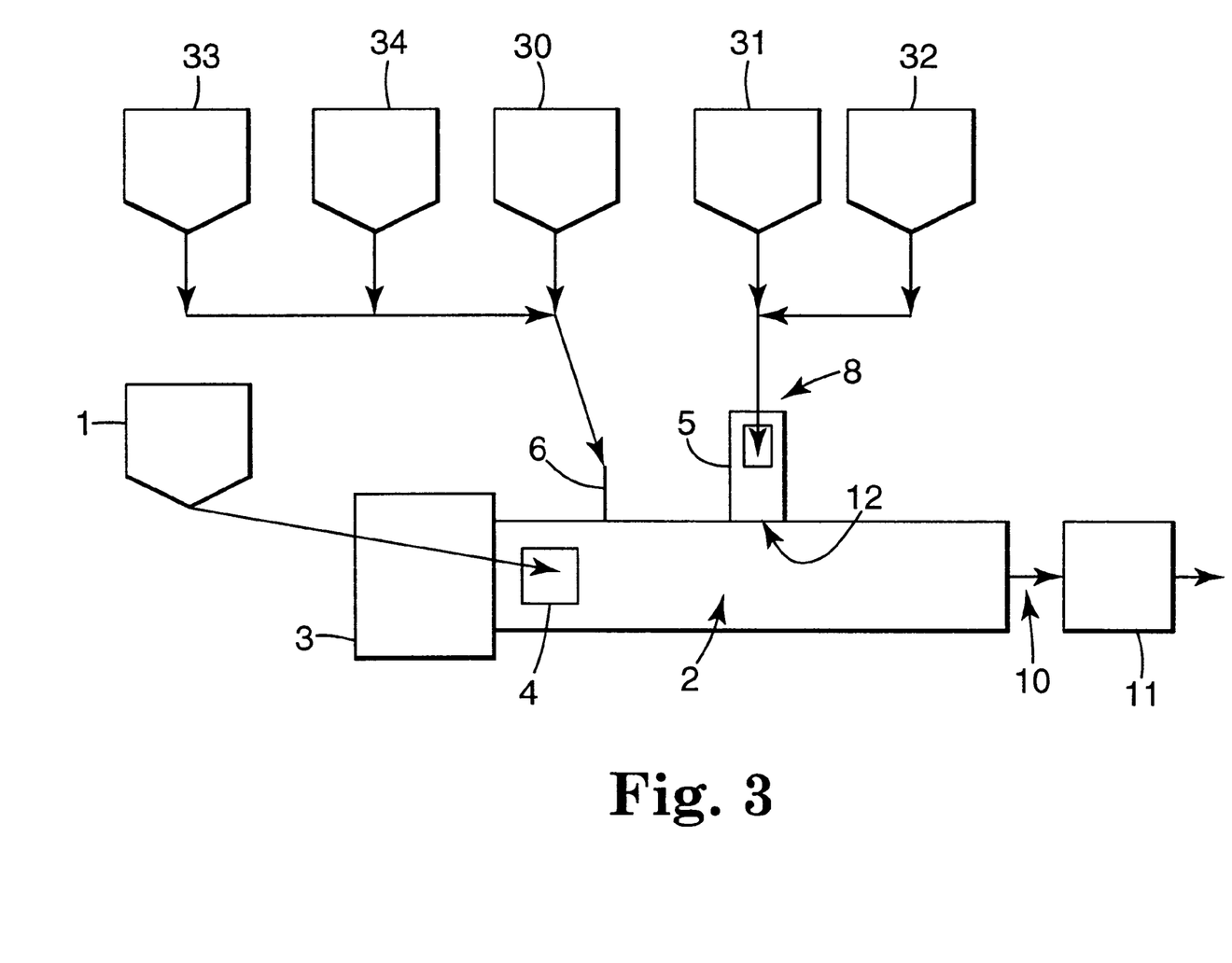

Still a different possible configuration is illustrated in FIG. 3. As is illustrated, the electrolyte salt is fed at the extruder's feed throat 4. A mixture containing only portions of the total amounts of active material and electrically-conducting material in the electrode, and the entire amount of ionically-conductive polymer, is fed at a downstream feed position 6. Specifically, each of feeders 30, 33, and 34, separately feed polymer, active material, and electrically-conductive material into a combined mixture that is fed at position 6 of extruder 2. Further downstream is fed a mixture of the remaining amounts of active material and electrically-conductive material. Specifically, active material and electrically-conductive material are each fed separately with feeders 31 and 32, and are combined into a mixture and fed to port 8 of sidefeeder 5 and then to extruder 2 at position 12.

A preferred electrochemical system relates to a battery that includes at least one cathode, at least one anode, a separator, and/or electrolyte.

The anode of, for example, a lithium battery, generally can consist of composite or film. The anode is generally applied to an expanded metal screen or metal foil (preferably aluminum, copper, or nickel) current collector using any one of a variety of processes such as coating, casting, pressing or extrusion. Specific examples of suitable battery anodes include lithium metal, lithium metal alloys, sodium metal, carbon-based materials such as graphite, coke, carbon fiber, pitch, transition metal oxides (such as $LiTi_5O_{12}$ and $LiWO_2$), and lithiated tin oxide. In the case of lithium ion batteries, the lithium may be intercalated into a host material such as carbon (i.e., to give lithiated carbon) or carbon alloyed with other elements (such as silicon, boron and nitrogen), a conductive polymer, or an inorganic host that is intercalatable (such as $Li_xTi_5O_{12}$). The material comprising the anode may be carried on foil (e.g., nickel and copper) backing or pressed into expanded metal screen and alloyed with various other metals. Also, in the case of a lithium metal foil, no current collector may be required.

Lithium batteries and supercapacitors may contain a separator to prevent short-circuiting between the cathode and anode. The separator of a battery usually consists of a single-ply or multi-ply sheet of microporous polymer (typically polyolefin, e.g., polyethylene, polypropylene, or combinations thereof) having a predetermined length and width and having a thickness of less than 10 mils (0.025 cm). For example, see U.S. Pat. No. 3,351,495 (Larsen et al.), U.S. Pat. No. 4,539,256 (Shipman et al.), U.S. Pat. No. 4,731,304 (Lundquist et al.) and U.S. Pat. No. 5,565,281 (Yu et al.). The pore size in these microporous membranes, typically about 5 microns in diameter, is sufficiently large to allow transport of ions but is sufficiently small to prevent cathode/anode contact, either directly or from particle penetration or dendrites which can form on the electrodes. In another battery embodiment the separator may comprise an ionically-conductive polymer and salt similar to that described for the electrode composition.

While the invention is described most specifically in terms of manufacturing certain cathodes, the invention is not limited to any specific embodiments identified in this description. For example, the invention can also be applied to the manufacture of anodes. An anode of a conventional lithium ion battery typically comprises a graphite composite with a binder such as polyvinylidenefluoride (PVDF). The graphite in this case is the active material that intercalates lithium. The anode could be manufactured according to the invention by alternately using an ionically-conductive polymer such as polyethylenoxide along with an electrolyte salt in the composite with the graphite.

The invention is illustrated further by, but is not intended to be limited to, the following examples.

EXAMPLE 1

Figure 4:
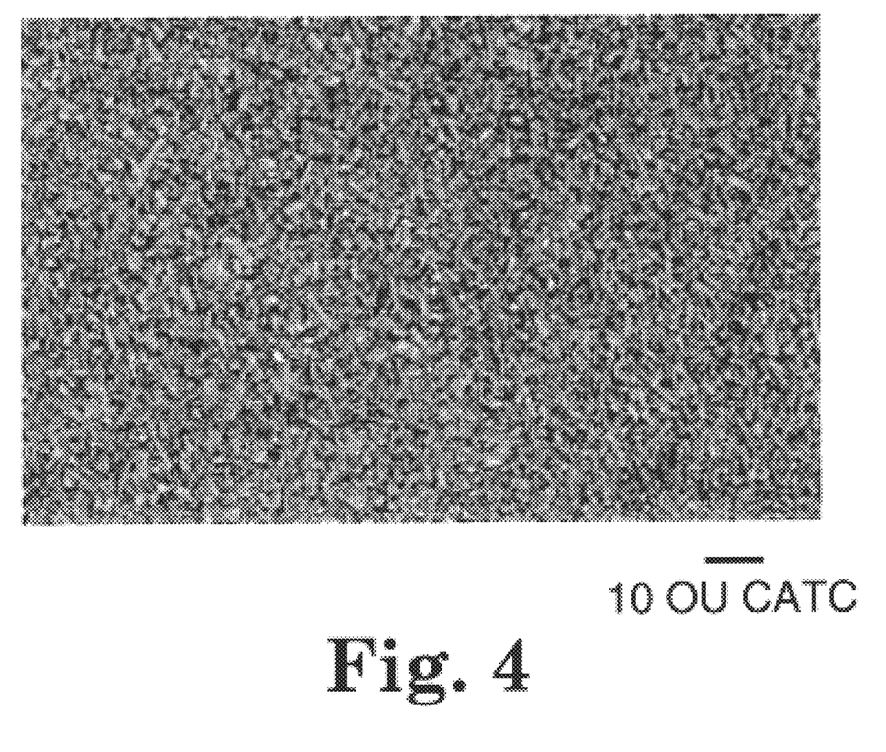
FIG. 4 is a photograph of a scanning electron microscope image of an exemplary electrode of the invention.

The process used a Buss Kneader® MKS30 (Buss Compounding Systems AG, Pratteln, Switzerland) reciprocating single screw extruder (RSSE) specially modified with internal loop water cooling of all zones. The RSSE was 30 mm in diameter and 18 L/D (length/diameter) in length. Overall throughput was 3.62 kg/hr. (8 lbs./hr.). The RSSE barrel near the feed throat was cooled with recirculating chilled water. The portion of the RSSE barrel from the feed throat to an L/D location of 5.5 was heated to a temperature setpoint of 60 C. The portion of the RSSE barrel from an L/D location of 5.5 to 18 was heated to a temperature setpoint of 80 C. The temperature of the extrudate at the end of the RSSE was 81–85 degrees C. The RSSE operated at 240 rpm. A twin screw sidefeeder was attached to the side of the RSSE at the L/D location of 10.8. 0.22 kg/hr of lithium bis (trifluoromethanesulfonyl)imide (3M, St. Paul, Minn.) was fed into the RSSE feed throat hopper from a Ktron T20 loss-in-weight (LIW) feeder (K-Tron America, Pitman, N.J.). 5.0 kg of ethylene oxide/propylene oxide/allyl glycidyl ether copolymer (DAP, available from Daichi-Cogyo Seiyaku, Japan) and 0.025 kg of Santanox R antioxidant (Flexsys America L. P., Akron, Ohio) were premixed in a Marion paddle mixer (Marion Mixers Inc., Marion, Iowa) for 5 minutes. 1.0 kg/hr of this "polymer powder" was fed from another identical Ktron feeder into a ¾" diameter single screw extruder (Davis-Standard Killion, Pawcatuck, Conn.) which melted the polymer and provided pressure to directly inject the molten polymer into the RSSE at an L/D location of 4.2. A "cathode powder" was prepared according to the method described in example 1 of U.S. Pat. No. 6,136,476 "Methods for Making Lithium Vanadium Oxide Electrode Materials," except that in this example the "cathode powder" consisted of 96% by weight oxide and 4% by weight carbon. 2.4 kg/hr of the premixed "cathode powder" was fed from another identical Ktron feeder into the RSSE's sidefeeder, which conveyed the powder into the RSSE at a L/D location of 10.8 where it was then compounded with the polymer and lithium salt. Samples were collected in an aluminum pan and then sealed in a polyethylene bag prior to testing. This example represents a loading of 62% by weight of the active oxide material. The SEM of the extruded material indicated excellent distributive mixing (See FIG. 4). Particle size analysis was done and found to be similar to that of a conventional solvent coating method. A round piece, approximately 20 mm diameter, and approximately 5 mm thick was cut from the bulk extrudate sample. The piece was placed between two sheets of low release coated PET and calendered to a thin film by multiple passes through a two roll mill. The final thickness of the cathode film was 30–90 microns. Surface roughness was measured with a WYKO vertical scanning interferometer (Veeco Instruments, Inc., Plainview, N.Y.) and shown to be far superior to cathode films prepared by solvent coating. The film was laminated to carbon coated aluminum foil (Rexam Image Products, South Hadley, Mass.) and the resulting cathode assembly was dried in a vacuum chamber for 80 minutes at 100 C. and set aside to be used in an electrochemical cell. An electrochemical cell was fabricated and tested according to the procedures described under "ELECTROCHEMICAL CELL PREPARATION" and "CYCLING PROTOCOL." The cell discharge capacity remained greater than 80% of its original capacity and the coulombic efficiency remained greater than 98% for 100 cycles.

Electrochemical Cell Preparation

A one inch diameter sample of a cathode assembly prepared in Example 1 was die cut and laminated under vacuum of 40 kPa and a pressure of 4.24 kPa at 80 C. for 15 minutes to a solid polymeric eletrolyte layer which has been affixed to one side of a lithium metal anode as described in U.S. Pat. No. 4,897,917 (Gauthier et al.). Solid polymer electrolyte compositions were prepared as follows. 100 parts by weight of ethylene oxide/propylene oxide/allyl glycidyl ether copolymer (available from Dai-Ichi-Cogyo Seiyaku, Japan) was dissolved in 150 parts by weight of 4:1 volume:volume acetonitrile:toluene. 21.7 parts by weight lithium bistrifluoromethylsulfonimide and 1 part by weight Irgacure 651 photoinitiator (available from Ciba-Geigy) were added sequentially, with stirring after each addition, until the solids were dissolved to form a polymer solution. An aliquot of the polymer solution described above was coated in a thin layer (to provide a layer of about 24 um after drying) onto a polypropylene film backing using a conventional knife coater, and then dried at 80° C. to form a solid polymer electrolyte film. Immediately after drying, the resulting film was passed through a chamber to expose the dry coat to an ultraviolet light source to crosslink the polymer. The film was then stored until used in an electrochemical cell. Alternatively, the solid polymer electrolyte film may also be prepared by any extrusion method. The electrochemically active area was defined by a circular mask of polypropylene placed between the cathode and the solid polymer electrolyte layer. The active area was 0.6 square inches. The laminated structure was heat sealed between two brass shims using a hot melt adhesive. The sealing process provides for protection from ambient atmosphere and for electric contacts necessary for the electrochemical evolution.

Cycling Protocol

The electrochemical cycling performance was obtained by discharging and recharging the cell in the following manner. During the discharging half-cycle, the cell was discharged at 2.55 mW constant power for 36 seconds or until 2.0 volts, then discharged at 20.4 mW constant power for 8 seconds or until 1.7 volts, then discharged at 12.75 mW constant power for 24 seconds or until 1.7 volts, charged at 5.1 mW constant power for 8 seconds, discharged at 5.1 mW constant power for 32 seconds or until 2.2 volts, charged at 5.1 mW constant power for 8 seconds, and rested for 14 seconds. This sequence of discharging and recharging steps, also known as a dynamic stress test (DST), was repeated until either the desired discharge capacity was achieved or one of the lower voltage limits was reached. At that point the discharge half-cycle was completed and the cell went into the recharged half-cycle which was accomplished at 1.2 mA constant current to 3.1 volts. The cell was repeatedly subjected to this testing cycle and the total discharge capacity as well as other cycling parameters were recorded.

EXAMPLE 2

The process of Example 1 was repeated but with the RSSE operated at 175 rpm. SEM and particle size distribution were similar to Example 1.

EXAMPLE 3

The process of Example 1 was repeated but with the RSSE operated at 200 rpm. SEM and particle size distribution were similar to Example 1.

EXAMPLE 4

The process of Example 1 was repeated substituting 100,000 MW polyethyleneoxide (PEO) (Union Carbide Corporation, Danbury, Conn.) for the DAP polymer. In addition the feed rates were 0.22 kg/h for the lithium bis(trifluoromethanesulfonyl)imide, 1.04 kg/hr for the "polymer powder" and 1.17 kg/hr for the "cathode powder." This represents 48% loading of the "cathode powder" material.

EXAMPLE 5

The process of Example 1 was repeated but with a higher loading of 65% loading of "cathode powder" material. The feed rates were 0.16 kg/hr for the lithium bis(trifluoromethanesulfonyl)imide, 0.75 kg/hr for the "polymer powder," and 1.68 kg/hr for the "cathode powder." A sample of the extrudate from this process was made into an electrochemicalcell and tested.

| Example | Salt kg/hr | Polymer Powder kg/hr | Cathode Powder kg/hr | Extruder RPM | % "Active" Loading |
|---|---|---|---|---|---|
| 1 | 0.22 | 1.0 | 2.4 | 240 | 62 |
| 2 | 0.22 | 1.0 | 2.4 | 175 | 62 |
| 3 | 0.22 | 1.0 | 2.4 | 200 | 62 |
| 4 | 0.22 | 1.04 | 1.17 | 200 | 46 |
| 5 | 0.16 | 0.75 | 1.68 | 200 | 62 |

What is claimed is:

1. A method for combining electrode components comprising:
   an active material,
   an ionically-conductive polymer,
   an electrolyte salt,
   and no added solvent,
   the method comprising processing the electrode components using a reciprocating single screw extruder.

2. The method of claim 1 wherein each electrode component contains essentially no solvent.

3. The method of claim 1 wherein each electrode component is a dry material that contains no solvent.

4. The method of claim 1 wherein the combined electrode components include essentially no solvent.

5. The method of claim 1 wherein the combined electrode components include a total of less than 0.5 percent by weight solvent.

6. The method of claim 1 wherein the active material comprises a metal oxide.

7. The method of claim 1 wherein the active material comprises a metal oxide selected from the group consisting of oxides of vanadium, manganese, cobalt, nickel, chromium, aluminum, tungsten, molybdenum, titanium, their lithiated versions, and mixtures thereof.

8. The method of claim 1 where the active material comprises a vanadium oxide.

9. The method of claim 1 wherein the electrode components comprise from about 50–86 weight percent active material.

10. The method of claim 1 wherein the electrode components comprise from about 60–68 weight percent active material.

11. The method of claim 1 wherein the components further comprise electrically-conductive material comprising carbon black, graphite, or a combination thereof.

12. The method of claim 1 wherein the ionically-conductive polymer comprises a derivative of monomers comprising an oxygen-containing monomer or a nitrogen-containing monomer.

13. The method of claim 1 wherein the ionically-conductive polymer comprises a polyalkylene oxide polymer or copolymer.

14. The method of claim 1 wherein the electrolyte salt comprises a fluorinated lithium salt.

15. The method of claim 1 wherein the electrolyte salt is chosen from the group consisting of lithium hexafluoroarsenate, lithium perchlorate, lithium hexafluorophosphate, lithium trifluoroborate, lithium trifluoromethanesulfonate, lithium bis(trifluoromethanesulfonyl)imide, lithium bis(perfluoroethanesulfonyl)imide, lithium tris(trifluoromethanesulfonyl)methide, and mixtures thereof.

16. The method of claim 1 wherein the electrode components comprise:

greater than about 50 weight percent active material, from about 1 to about 10 weight percent electrically-conductive material comprising carbon black, graphite, or a combination thereof, from about 10 to about 40 weight percent ionically-conductive polymer, from about 3 to about 15 weight percent lithium salt, and less than about 0.5 weight percent solvent.

17. The method of claim 16 wherein the active material comprises a metal oxide selected from the group consisting of oxides of vanadium, manganese, cobalt, nickel, chromium, aluminum, tungsten, molybdenum, titanium, their lithiated versions and mixtures thereof.

18. The method of claim 16 where the ionically-conductive polymer comprises a derivative of monomers comprising an oxygen-containing monomer or a nitrogen-containing monomer.

19. The method of claim 16 wherein the ionically-conductive polymer comprises a polyalkylenoxide polymer or copolymer.

20. The method of claim 16 wherein the lithium salt is chosen from the group consisting of lithium hexafluoroarsenate, lithium perchlorate, lithium hexafluorophosphate, lithium trifluoroborate, lithium trifluoromethanesulfonate, lithium bis(trifluoromethanesulfonyl)imide, lithium bis(perfluoroethanesulfonyl)imide, lithium tris(trifluoromethanesulfonyl)methide, and mixtures thereof.

21. The method of claim 1 wherein the extruder comprises multiple feed inlets and a downstream extruding end, and wherein the ionic salt feeds into the extruder at a first feed position, the ionically-conductive polymer, the active material, and the electrically-conductive material each feed into the extruder at one or more feed positions downstream from the ionic salt feed position.

22. The method of claim 21 wherein the ionically-conductive polymer feeds into the extruder as a solid containing no solvent.

23. The method of claim 21 wherein the ionically-conductive polymer feeds into the extruder as a melt.

24. The method of claim 21 wherein the ionically-conductive polymer feeds into the extruder at a second position downstream from the first feed position, and a mixture comprising active material and electrically-conductive material is fed at a third feed position downstream from the second feed position.

25. The method of claim 21 wherein ionically-conductive polymer, active material, and electrically-conductive material are combined and fed into the extruder as a single mixture at a second feed position.

26. The method of claim 21 wherein a mixture comprising active material, electrically-conductive material, and ionically-conductive polymer is fed at a second feed position, and a mixture comprising active material and electrically-conductive material is fed at a third feed position downstream from the second feed position.

27. A method for combining electrode components comprising:

an active material, an ionically-conductive polymer, an electrolyte salt, wherein the method comprises processing the electrode components using a reciprocating single screw extruder and wherein an ionically-conductive polymer salt complex material is processed in a molten state.

28. A method of producing a battery cathode, the method comprising processing a mixture of ingredients comprising:

greater than about 50 weight percent active material, from about 1 to about 10 weight percent electrically-conductive material comprising carbon black, graphite, or a combination thereof, from about 10 to about 40 weight percent polymer comprising ionically-conductive polyalkylenoxide polymer, from about 3 to about 15 weight percent fluorinated lithium salt, wherein the mixture includes a total of less than about 0.5 percent by weight solvent, the method comprising using a reciprocating extruder and processing an ionically-conductive polymer salt complex in a molten state.

29. The method of claim 28 further comprising depositing an extrudate of the electrode components onto a substrate.

30. The method of claim 29 wherein the substrate is chosen from the group consisting of a liner, a current collector, a separator, or an electrolyte.

31. The method of claim 28 wherein the ingredients include at least about 50 weight percent active ingredient.

32. The method of claim 28 wherein the ingredients include at least about 60 weight percent lithiated vanadium oxide.

33. A method for combining electrode components comprising:

ionically-conductive polymer, electrolyte salt, the method comprising processing electrolyte components using a reciprocating single screw extruder, wherein ionically-conductive polymer is fed to the extruder downstream from electrolyte salt.

34. The method of claim 33 wherein the ionically-conductive polymer feeds into the extruder as a melt.

35. The method of claim 33 wherein the electrode components contain no added solvent.

36. The method of claim 33 wherein the components further comprise active material.

* * * * *

UNITED STATES PATENT AND TRADEMARK OFFICE
CERTIFICATE OF CORRECTION

PATENT NO. : 6,589,299 B2  Page 1 of 1
DATED : July 8, 2003
INVENTOR(S) : Missling, Jeffrey J.

It is certified that error appears in the above-identified patent and that said Letters Patent is hereby corrected as shown below:

Title page,
Item [56], References Cited, OTHER PUBLICATIONS, please add -- Serial No. 09/139,315, filed August 25, 1998 --

Column 2,
Line 22, "dietheyl" should be -- diethyl --;
Line 24, "phthlate" should be -- phthalate --;

Column 6,
Line 30, "dietheyl" should be -- diethyl --;
Line 32, "phthlate" should be -- phthalate --;

Column 7,
Line 12, "single-crew" should be -- single-screw --;

Column 9,
Lines 41-42, delete "side feeder" following "side feeder";

Column 12,
Line 59, "Dai-Ichi-Cogyo" should be -- Daichi-Cogyo --;
Line 54, "eletrolyte" should be -- electrolyte --;

Column 14,
Line 12, "electrochemicalcell" should be -- electrochemical cell --.

Signed and Sealed this

Eighth Day of June, 2004

JON W. DUDAS
*Acting Director of the United States Patent and Trademark Office*